Sept. 20, 1960    H. LINDE    2,953,265
REFUSE COLLECTING VEHICLE
Filed Jan. 27, 1958
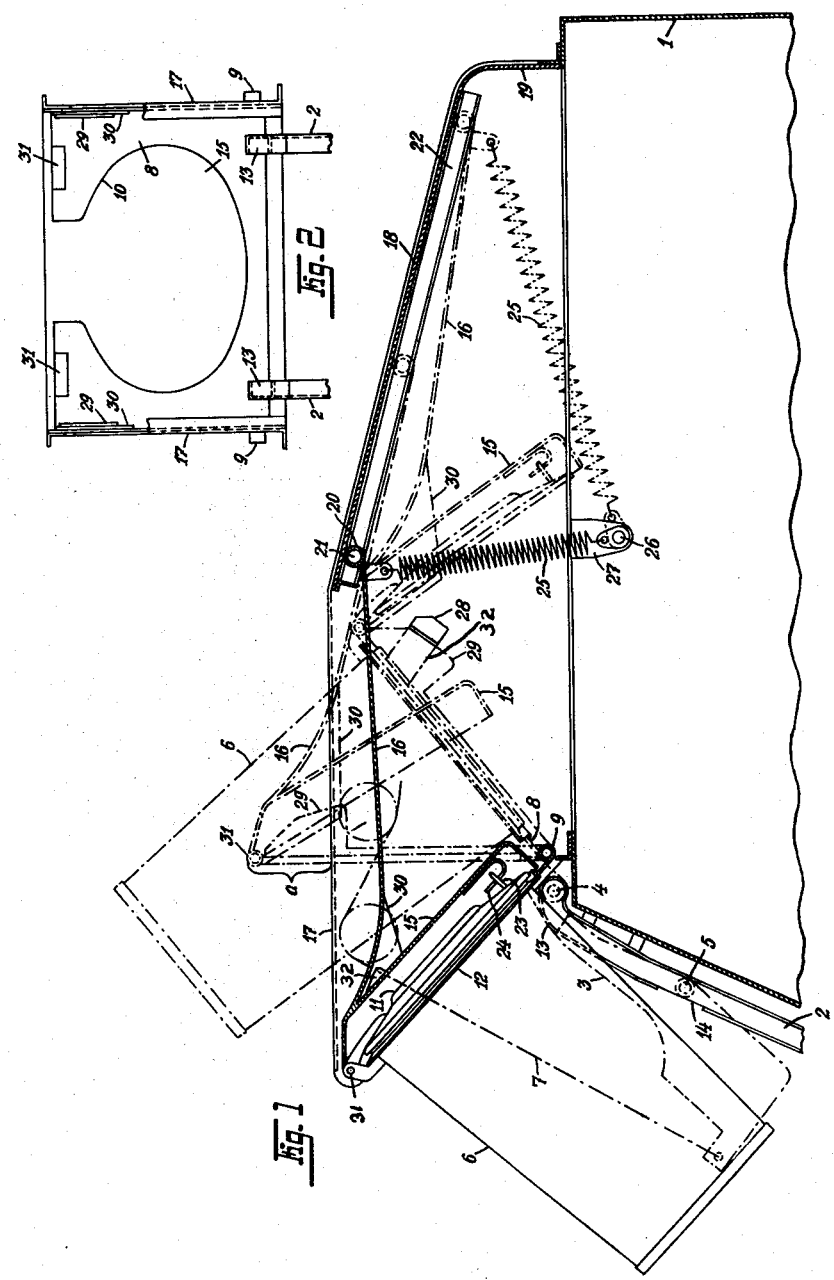

United States Patent Office

2,953,265
Patented Sept. 20, 1960

2,953,265

REFUSE COLLECTING VEHICLE

Hilding Linde, St. Bjornvagen 44, Kalmar 3, Sweden

Filed Jan. 27, 1958, Ser. No. 711,286

3 Claims. (Cl. 214—303)

The invention relates to a refuse collecting vehicle with a device for dustless discharge of dustbins into a collecting container provided on a chassis, which container is provided with an emptying plate having a discharge opening corresponding to the mouth of the dustbin and being pivoted at its lower end so as to be swingable between two side walls.

If such vehicles are not provided with means for compressing the dust, such as a feed screw, it is desired to have the dustbins emptied into the container as high as possible for better utilizing the loading capacity. When a hoisting device for the dustbins is used the emptying plate may be located at any desired height, and from this point of view the volume of the container may be increased at will by increasing the height of the container. However, a limitation of the height is dependent on the fact that the vehicles have to be housed in existing garages and that in new garages the openings should not be too large and the doors too heavy. Vehicles of the kind set forth have usually had the uppermost portion formed of a discharge hood at least partly covered and provided with a pivoted emptying plate for the dustbin. This emptying plate, in its normal position, has usually been substantially vertical, and the side walls have reached above the emptying plate.

It is an object of the invention to reduce the height of the top structure of the collecting container and simultaneously increase its load space without increasing the total height of the vehicle.

Other objects and advantages will be apparent from the following description of a vehicle according to one form of the invention and the accompanying drawing, in which:

Figure 1 is a vertical sectional view of the upper part of the collecting container, and Figure 2 is an end view of the top structure.

To the rear wall of the collecting container 1 are fastened two U-shaped guide rails 2 for a bin carrier 3 indicated with dot and dash lines and provided with two upper wheels 4 and two lower wheels 5. In this carrier a dustbin 6 is shown supported by coupling members, and, by means of a suitable hydraulic hoisting device with two wires 7 fastened to the carrier, the bin has been raised to the position shown in the drawing. An emptying plate 8 pivoted at its lower edge by means of a shaft 9 has a discharge opening 10, through which the cover 11 of the bin passes and against the edge of which one flange of an angle iron ring 12 secured to the mouth of the bin may rest. In this position the upper wheels 4 of the carrier occupy their upper end position limited by two pockets 13 fastened to the emptying plate and swinging together with the plate, whereas the lower wheels 5 are located opposite to two openings 14 in the outer flanges of the guide rails. A shutter 15 connected with the emptying plate 8 by a pivot 31 covers the discharge opening 10 on the inside thereof. The shutter is rigidly connected with an essentially horizontal roof plate 16 which together with the emptying plate are movable with their side edges close to the vertical side walls of the hood. The rear portions of the upper edges of the side walls are connected by a fixed roof portion 18 which has its rear end bent downwards at 19 and secured to the container 1. The roof plate 16 is at the rear end connected with a transverse tube 20 immediately below the roof portion 18, and the tube has its ends provided with rollers 21 running in U-shaped guides 22 secured to the side walls. Two tension springs 25 are rotatably fastened to the inner end of the roof plate 16, and the other ends are rotatably fastened to pins 26 secured to downwardly extended holders 27 which are so located that the springs occupy substantially vertical positions.

When the upper wheels 4 of the carrier enter into the pockets in the end position a bow 23 on the bin cover engages a hook 24 on the shutter. When the hoisting motion by means of the wires 7 continues the carrier, the dustbin and the emptying plate rotate on the shaft 9, whereby the shutter 15 by means of the roof plate 16 and the guides 22 are swung upwards and thereby open the cover 11. When the emptying plate has occupied the vertical position shown by dot and dash lines, its upper portion extends the distance *a* above the side walls 17. In the inner end position, shown by dot and dash lines, the rotating motion is limited by a fixed member 28 as explained below. During the rotating motion the spring 25 is, at first, idle and, thus, will not counteract the emptying plate during its swinging motion upwards, but in the inner end position of the emptying plate the spring is stretched so that on the return motion of the dustbin the spring keeps the emptying plate pressed against the dustbin and prevents a separation. Coupling members ordinarily used for coupling them together may thus be dispensed with.

When the emptying plate occupies its vertical position a triangular opening is formed between the upper portion of the emptying plate and the roof plate 16 above the side walls, and to prevent the dust from escaping through this opening the emptying plate is provided with side plates 29 and the roof plate 16 with side plates 30 which plates are parallel to the side walls and overlap each other for closing the openings. The plates 29, 30 have such a form that, in the normal position of the emptying plate, they are covered by the side walls. The plates 29 serve also to limit the rotation of the emptying plate 8 in its end position by striking against the fixed member 28, but if the plates 29 are made of a thin sheet iron they may be reinforced by a stud or limit stop as indicated at 32 in Fig. 1. The collecting container is as usual mounted on a truck chassis not shown in the drawing. In the form of the invention shown in the drawing the emptying plate forms an angle of about 45° with the vertical line, but this angle may vary within certain limits, and also other modifications of the shown details may be modified without departure from the invention and the advantages attained thereby.

What I claim is:

1. In a refuse collecting vehicle, a refuse collecting container having an opening in its uppermost portion, two parallel side walls one on each side of said opening and extending upwards so as to form the highest portion of the structure of the vehicle, a sloping emptying plate pivoted swingably between said side walls at its lower edge on an axis located above the highest portion of the container and extending in its normal position to a point located below the upper edges of said side walls but in its vertical position above said upper edges, said emptying plate having a discharge opening for receiving the mouth of a dustbin to be discharged, a roof plate provided between said side walls above said opening in the container, which roof plate at one end is pivotally connected to said empty-plate, a guiding device connected with the opposite end of said roof plate, two guide rails provided on the container, a bin carrier running in said guide rails, and hoisting wires connected therewith for raising and tilting the carrier together with the bin.

2. In a refuse collecting vehicle, a refuse collecting container having an opening in its uppermost portion, two parallel side walls one on each side of said opening and extending upwards so as to form the highest portion of the structure of the vehicle, a sloping emptying plate pivoted swingably between said side walls at its lower edge on an axis located above the highest portion of the container and extending in its normal position to a point located below the upper edges of said side walls but in its vertical position above said upper edges, said emptying plate having a discharge opening for receiving the mouth of a dustbin to be discharged, a roof plate provided between said side walls above said opening in the container, which roof plate at one end is pivotally connected to said emptying plate, a fixed roof portion on said container located adjacent said container opening, two guide rails provided below said fixed roof portion between said side walls for guiding the other end of said roof plate, two tension springs arranged substantially vertically between the guided end of the roof plate and a spring for pressing the emptying plate against the bin during the return motion, two guide rails provided on the container, a bin carrier running in said guide rails, and hoisting wires connected therewith for raising and tilting the carrier together with the bin.

3. In a refuse collecting vehicle, a refuse collecting container having an opening in its uppermost portion, two parallel side walls one on each side of said opening and extending upwards so as to form the highest portion of the structure of the vehicle, a sloping emptying plate pivoted swingably between said side walls at its lower edge on an axis located above the highest portion of the container and extending in its normal position to a point located below the upper edges of said side walls but in its vertical position above said upper edges, said emptying plate having a discharge opening for receiving the mouth of a dustbin to be discharged, a roof plate provided between said side walls above said opening in the container, which roof plate at one end is pivotally connected to said emptying plate, a guiding device connected with the opposite end of said roof plate, at least one of said plates being provided with at least one side plate closing a space between said side plates and said roof plate when the emptying plate occupies its vertical position, two guide rails provided on the container, a bin carrier running in said guide rails, and hoisting wires connected therewith for raising and tilting the carrier together with the bin.

References Cited in the file of this patent

UNITED STATES PATENTS

| 2,488,429 | Ochsner | Nov. 15, 1949 |
| 2,683,543 | Linde | July 13, 1954 |

FOREIGN PATENTS

| 307,887 | Great Britain | May 29, 1930 |